(12) United States Patent
Dakkak et al.

(10) Patent No.: US 11,147,108 B2
(45) Date of Patent: Oct. 12, 2021

(54) METHOD FOR PERFORMING CONTINUOUS DEPLOYMENT AND FEEDBACK FROM A RADIO NETWORK NODE

(71) Applicant: TELEFONAKTIEBOLAGET LM ERICSSON (PUBL), Stockholm (SE)

(72) Inventors: Anas Dakkak, Upplands Väsby (SE); Christian Skärby, Stockholm (SE); Daniel Ståhl, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/772,399

(22) PCT Filed: Dec. 20, 2017

(86) PCT No.: PCT/SE2017/051311
§ 371 (c)(1),
(2) Date: Jun. 12, 2020

(87) PCT Pub. No.: WO2019/125243
PCT Pub. Date: Jun. 27, 2019

(65) Prior Publication Data
US 2021/0076431 A1    Mar. 11, 2021

(51) Int. Cl.
*H04L 12/24* (2006.01)
*H04L 29/08* (2006.01)
(Continued)

(52) U.S. Cl.
CPC .............. *H04W 76/10* (2018.02); *H04W 4/50* (2018.02)

(58) Field of Classification Search
CPC ...... H04W 76/10; H04W 4/50; H04L 41/082; H04L 67/34; H04L 41/04; G06F 8/65; G06F 9/445
See application file for complete search history.

(56) References Cited

U.S. PATENT DOCUMENTS 7,200,390 B1 * 4/2007 Henager ............... H04W 8/245
455/412.1
8,677,315 B1    3/2014 Anderson et al.

FOREIGN PATENT DOCUMENTS

WO    WO01/93615 A1 *  6/2001
WO      0193615 A1    12/2001

OTHER PUBLICATIONS

Retrieved Jun. 10, 2020 from Agile Alliance Glossary Definition Continuous Deployment, https://www.agilealliance.org/glossary/continuous-deployment [on-line], 9 pages.

(Continued)

*Primary Examiner* — Joseph E Dean, Jr.
(74) *Attorney, Agent, or Firm* — Patent Portfolio Builders PLLC (57) ABSTRACT

Embodiments herein relate to a method for performing continuous deployment and feedback between a radio network node and a Continuous Deployment server. The radio network node is configured to mimic a behavior of a mobile terminal towards a core network. The radio network node sends a message comprising a request to establish an end-to-end connection with the CD server to a core network node. The message further comprises a mobile identity identifying the radio network node as a mobile terminal. The radio network node receives an access bearer establishing a user plane connection between radio network node and the core network node over a user plane interface, from the core network node. The radio network node establishes a communication channel between the radio network node and the CD server over the user plane interface and an external packet switched network. The radio network node exchanges information between the radio network node and the CD server over the established communication channel.

(Continued)

Embodiments herein further relate to a method performed by a CD server, a radio network node and a CD server.

16 Claims, 8 Drawing Sheets

(51) Int. Cl.
*H04W 76/10* (2018.01)
*H04W 4/50* (2018.01)

(56) References Cited

OTHER PUBLICATIONS

International Search Report/Written Opinion in related/corresponding PCT Application No. PCT/SE2017/051311 dated Jul. 25, 2018.

\* cited by examiner

METHOD FOR PERFORMING CONTINUOUS DEPLOYMENT AND FEEDBACK FROM A RADIO NETWORK NODE

TECHNICAL FIELD

Embodiments herein relate to a method and a radio network node for performing continuous deployment and diagnostic and operations feedback in a telecommunications network.

BACKGROUND OF THE INVENTION

Continuous Deployment (CD) is changing the software industry. It started with online and web applications and now taking over in embedded systems products such as automobiles industries. One aim of CD is to minimize lead time, the time elapsed between development writing one new line of code and this new code being used by live users, in production. CD relies on infrastructure that automates deployment and feedback process in quick and efficient manner.

CD allows the organization developing a software, such as e.g. a vendor of a radio network node, to deploy newly developed software code as frequently and quickly as possible to production live systems, such as e.g. radio network nodes in commercial customer networks. Each deployment gives the development organization fast feedback and brings new functionality to the receiving customer. This is a contrast to what has been exercised for years where the first deployment comes after a long period of development work, usually months for a new radio network node software.

Currently, executing operations and maintenance activities such as software update, performance and diagnostic data collection is done utilizing an Operations and Maintenance (O&M) interface in the radio network node. In a typical telecommunication network, the O&M interface is separated from a user/control plane interface. In an LTE network, as an example, the O&M interface of the radio network node usually shares the same physical interface with the user/control plane interface, wherein the interface is used by actual mobile subscribers for user and control plane traffic, although with a separate IP address. This allows the transport network to separate between O&M traffic and user plane/control plane.

The O&M network is however a secure and private network which may only be accessed by obtaining several levels of security credentials from the outside. Establishing a connection to a radio network node requires typically an access to a Management System, by which a session can be established to an O&M address of the radio network node. Therefore, uploading new software into a radio network node, or sending diagnostic and performance data to the vendor requires passing through several layers of security gates.

As mentioned above, CD needs automation to work efficiently. Configuring the O&M network to allow external access, such as from the vendor's side, with decent bandwidth in order to continuously transfer node specific data, such as diagnostics, new software, performance data etc., is time consuming, difficult, costly and in many cases requires manual intervention. Creating an external access to the radio network node requires, in addition, configuring several gateways to allow the access. Therefore, this process is difficult to generalize as it depends on the policies and the network configurations of the individual operator. This makes it rather difficult to have an automated CD process using the O&M architecture.

The current paradigm of O&M is well suited to infrequent software deployments without the need for constant gathering of diagnostic and performance data from to the vendor's side. Therefore, passing information from and to the radio network node is commonly a manual operation. The architecture is not meant to facilitate continuous deployment focusing on automating and high deployment frequency.

SUMMARY OF THE INVENTION

It is thus an object of embodiments herein to provide a method for performing continuous deployment for a radio network node which overcomes the disadvantages mentioned above.

According to a first aspect of embodiments herein, the object is achieved by a method performed by a radio network node, for performing continuous deployment and feedback between the radio network node and a Continuous Deployment (CD) server. The radio network node is configured to mimic a behavior of a mobile terminal towards a core network. The radio network node sends a message to a core network node, comprising a request to establish an end-to-end connection with the CD server. The message further comprises a mobile identity identifying the radio network node as a mobile terminal. The radio network node receives a Radio Access Bearer, RAB, establishing a user plane connection between the radio network node and the core network node over a user plane interface from the core network node. A communication channel is established between the radio network node and the CD server over a user plane interface and an external packet switched network. The radio network node and the CD server further exchange information over the established communication channel.

According to a second aspect of embodiments herein, the object is achieved by a method performed by a Continuous Deployment (CD) server, for performing continuous deployment and feedback between a radio network node and the CD server. The radio network node is configured to mimic a behavior of a mobile terminal towards a core network. The CD server establishes a communication channel between the radio network node and the CD server over a user plane interface and an external packet switched network. The CD server and the radio network node exchange information over the established communication channel.

According to a third aspect of embodiments herein, the object is achieved by a radio network node, for performing continuous deployment and feedback between the radio network node and a Continuous Deployment (CD) server. The radio network node is configured to mimic a behavior of a mobile terminal towards a core network. The radio network node is configured to send a message comprising a request to establish an end-to-end connection with the CD server to the core network node. The message further comprises a mobile identity identifying the radio network node as a mobile terminal. The radio network node is configured to receive a Radio Access Bearer, RAB, establishing a user plane connection between the radio network node and the core network node over a user plane interface from the core network node. The radio network node is further configured to establish a communication channel between the radio network node and the CD server over the user plane interface and an external packet switched network. The radio network node is further configured to exchange information between the radio network node and the CD server over the established communication channel.

According to a fourth aspect of embodiments herein, the object is achieved by a Continuous Deployment (CD) server, for performing continuous deployment and feedback between a radio network node and the CD server. The radio network node is configured to mimic a behavior of a mobile terminal towards a core network. The CD server is configured to establish a communication channel between the radio network node and the CD server over a user plane interface and an external packet switched network. The CD server is further configured to exchange information between the radio network node and the CD server over the established communication channel.

It is furthermore provided herein a computer program comprising instructions, which, when executed on at least one processor, cause the at least one processor to carry out any of the methods above, as performed by the radio network node. It is additionally provided herein a computer-readable storage medium, having stored thereon a computer program comprising instructions which, when executed on at least one processor, cause the at least one processor to carry out the method according to any of the methods above, as performed by the radio network node.

It is furthermore provided herein a computer program comprising instructions, which, when executed on at least one processor, cause the at least one processor to carry out any of the methods above, as performed by the CD server. It is additionally provided herein a computer-readable storage medium, having stored thereon a computer program comprising instructions which, when executed on at least one processor, cause the at least one processor to carry out the method according to any of the methods above, as performed by the CD server.

The embodiments herein use an existing user path for UEs to establish a secure connection to the CD server.

The embodiments thereby enable a drastically reduced deployment cycle in comparison to deployment over the O&M network by removing obstacles to automation of the deployment activity.

The embodiments herein further have the benefit that they allow near real time feedback to be received from nodes by the CD Server. This allows the vendor of the network node to have greater visibility and required data for diagnostic and performance evaluation.

Furthermore, labor and workforce cost is reduced thereby contributing to a lower operational and maintenance cost of the network nodes.

DEFINITIONS

| Abbreviation | Explanation |
| --- | --- |
| VSE | Virtual Subscriber Entity. |
| VPN | Virtual Private Network. |
| MME | Mobility Management Entity. |
| CD | Continuous Deployment. |
| UE | User Equipment. |
| O&M | Operation and Maintenance |

BRIEF DESCRIPTION OF THE DRAWINGS

Embodiments will now be described in more detail in relation to the enclosed drawings, in which.

DETAILED DESCRIPTION OF PREFERRED EMBODIMENTS

Figure 1:
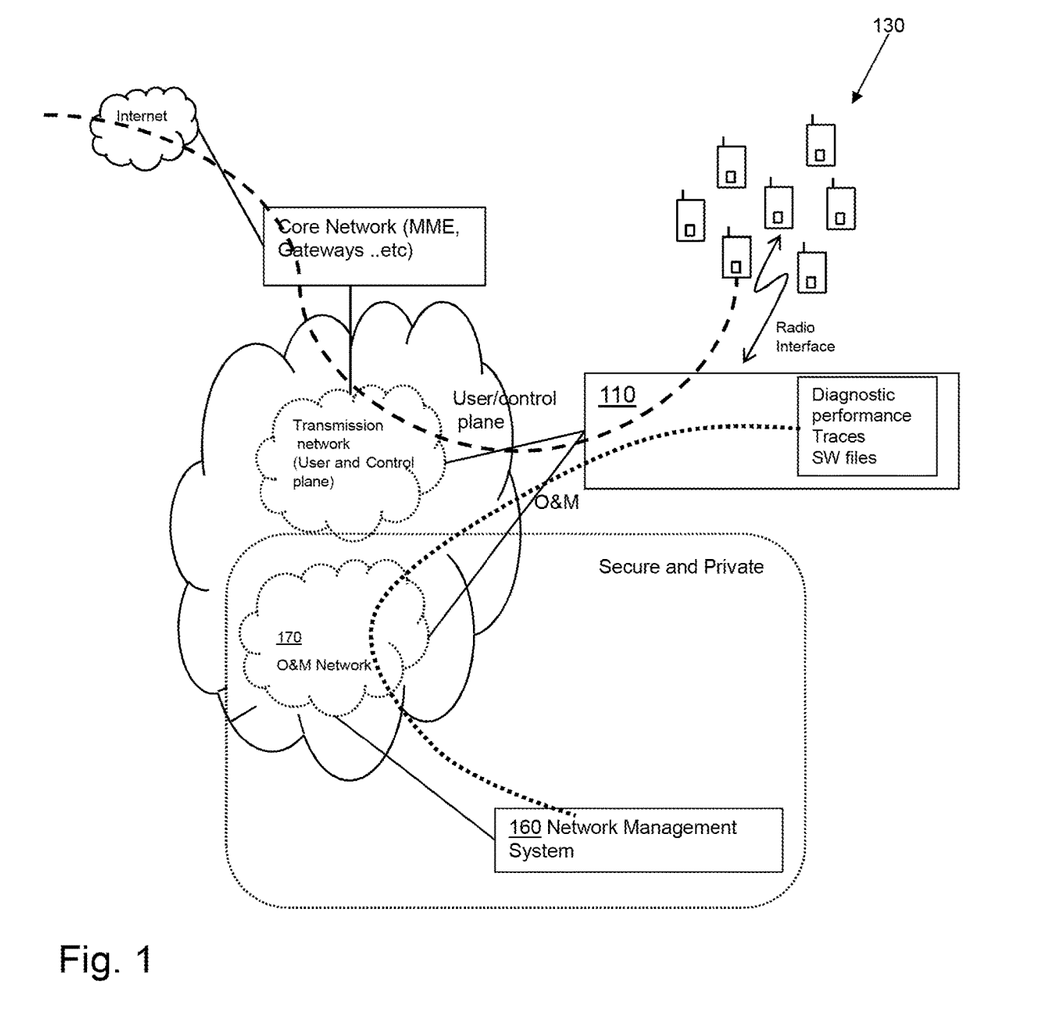
FIG. 1 is a schematic overview depicting a communication network according to prior art.

FIG. 1 discloses an example of a known communication network, which allows the transport network to separate between O&M traffic and user plane/control plane. The radio network node 110 is connected to a Network Management System (NMS) 160 via an O&M network 170 and may exchange information with the NMS 160 via a physical interface which may also be used as the user/control plane interface. The same interface may further be used by one or more mobile terminals 130, such as a UE, for user and control plane traffic. The O&M network 170 is a secure and private network which may be only accessed by obtaining several levels of security credentials from the outside. Establishing a connection to the radio network node 110 typically first requires access to a Management System, by which a session may be established to an O&M address of the radio network node 110. Therefore, uploading new software into the radio network node 110, or sending diagnostic and performance data to the vendor via the O&M network 170 is very complex and time consuming since it requires passing through several layers of security gates.

Figure 2:
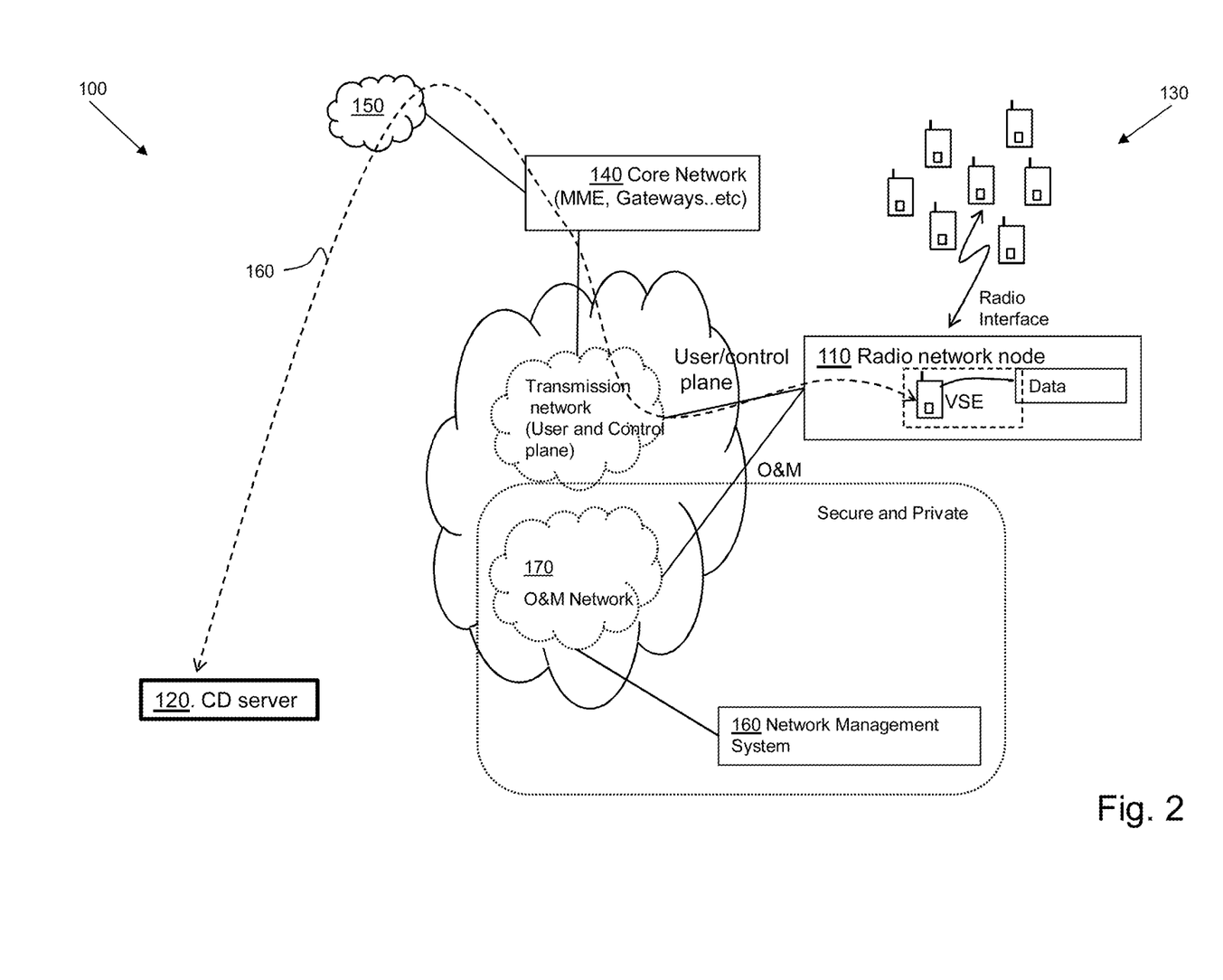
FIG. 2 is a schematic overview depicting a communication network according to embodiments herein.

FIG. 2 shows a communications network 100 according to the embodiments disclosed herein. The radio network node 110, such as e.g. an eNB, a gNB or a 2G/3G radio network node, mimics the behavior of a mobile terminal 130, such as e.g. a UE, towards the core network. The radio network node may e.g. transmit a mobile identity to a core network node 140, which will identify the radio network node 110 as a mobile terminal. Hence, the radio network node 110 will look like a real UE with real subscription to the Core Network side. The radio network node 110 may e.g. comprise a Virtual Subscriber Entity (VSE) being configured with the mobile identity. This will allow the radio network node 110, and/or the VSE, to utilize the existing internet connection that is available for commercial mobile terminals 130, such as UEs, to establish a communication channel 160 with the CD server. In an embodiment herein relating to LTE, the mobile identity may be an IMSI and the connection to the core network may be initiated by the radio network node by sending an attach request Non-Access Stratum (NAS) message or a service request NAS message.

The radio network node 110 and/or the VSE may be programmed a vendor of the radio network node 110 to establish the communication channel 160 with the CD server provided by the vendor only. The communication channel 160 may be an end-to-end (E2E) connection between the radio network node 110 and the CD server 120. The communication channel 160 may further be secure connection, such as e.g. using a Virtual Private Network (VPN) application. Thereby, the risk of the radio network node 110 being hacked and/or the VSE being used as a backdoor means to gain access to the radio network node 110 by non-authorized servers is reduced. The communication channel 160 may be established by utilizing an existing control and user plane interface between the radio network node and a user plane interface in order to provide access to an external packet switched network (PS) 150, for the radio network node 110. The external PS network 150 may be one of, or a combination of more than one of, a public, private or hosted network; the PS network 150, may be a backbone network or the Internet. The user plane interface may in an embodiment relating to LTE be an S1 interface.

As mentioned, from a perspective of the core network, the connection will be perceived just like any normal subscriber using a mobile terminal for establishing a secure connection, such as e.g. a subscriber reading his work email from a mobile phone. However, on the side of the radio network node 110, the radio network node 110, and/or the VSE comprised in the radio network node 110, initiates and terminates the user plane traffic. Hence, the user plane traffic over the established communication channel 160 does not require any radio resources, such as e.g. RRC connections, which is the case when the user plane traffic is initiated and terminated at a genuine mobile device 130, such as e.g. a UE. Thereby, the Continuous Deployment according to the embodiments herein does not consume any radio resources and thus does not adversely affect the radio connection, such as e.g. RRC signaling between genuine mobile devices 130 and the radio network node. The radio network node 110, and/or the VSE comprised in the radio network node 110, may signal a pre-defined or configured mobile identity with a core network node 140, such as e.g. an MME, and may obtain an access bearer, such as e.g. a Radio Access Bearer (RAB) or an Enhanced Radio Access Bearer (E-RAB) depending on the technology used, in order to establish a user plane connection over the user plane interface.

By allowing the radio network node and the CD server to establish a connection via the user plane interface and the external network a dramatically shortened deployment cycle is enabled by removing obstacles preventing automation of the deployment activity.

Furthermore, near real time feedback can be received from radio network nodes to the CD Server allowing the vendor to have greater visibility and enough data for diagnostic and performance evaluation.

Labor and workforce cost may also be reduced, thereby contributing to a lower operational and maintenance cost of the radio network node.

Figure 3:
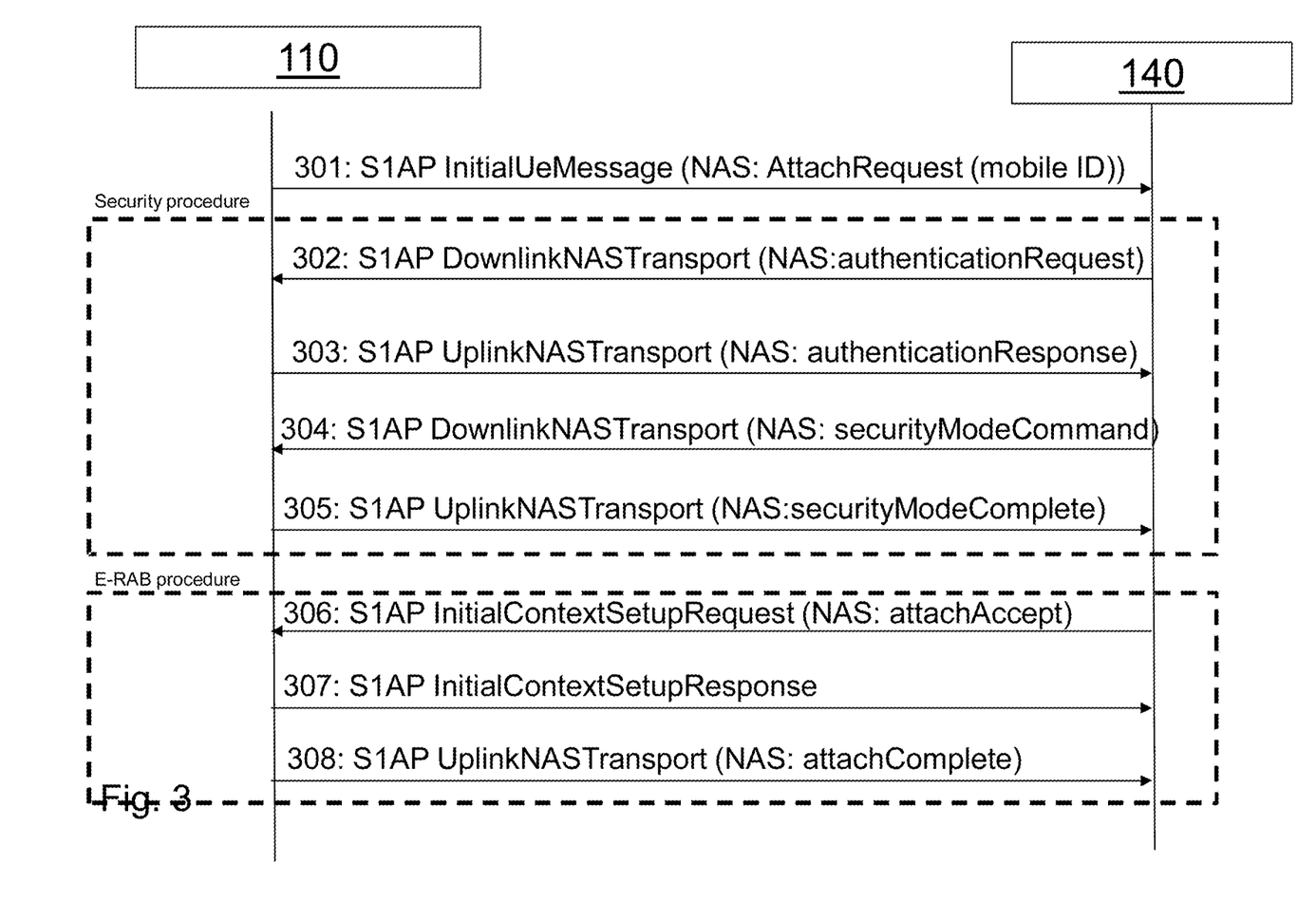
FIG. 3 is a signaling diagram depicting an attach procedure for the radio network node according to embodiments herein.

FIG. 3 shows a signaling diagram according to one embodiment herein, in which the message requesting to establish an end-to-end connection with the CD server is an S1AP attach procedure, which may be used by the radio network node 110 to gain access to NAS-level services, such as e.g. Internet connectivity, via the core network node 140.

The attach procedure starts with the radio network node 110, and/or the VSE comprised in the radio network node 110, triggering an attach procedure towards the core network node 140. If this is the first time the radio network node 110, and/or the VSE, attaches to the core network, the radio network node 110, and/or the VSE, may send an attach request NAS message 301 comprising its mobile identity, such as e.g. an IMSI number. If the radio network node 110, and/or the VSE, has been previously connected to the core network node the radio network node 110, and/or the VSE, will use its previously obtained Globally Unique Temporary UE Identity (GUTI) value from the core network node 140, such as the MME, when applicable.

The core network node 140 may trigger the authentication and security mode command procedure by sending a downlink NAS transport message over S1AP comprising a NAS message Authentication Request 302. The radio network node 110, and/or the VSE, will then respond with an Authentication Response 303 carried by an S1AP Uplink NAS transport message. This is followed by a Security Mode Command NAS message 304 carried with an S1AP Downlink NAS transport message. The radio network node 110, and/or the VSE, may respond with a Security Mode Complete 305 sent via S1AP Uplink NAS Transport. The radio access bearer establishment, such as e.g. an Enhanced Radio Bearer (E-RAB) establishment procedure starts with the core network node 140 sending an Initial UE context Setup S1AP setup message with an embedded Attach Accept NAS message 306. The radio network node 110, and/or the VSE, may reply with an Initial Context Setup response message 307 and following that an Uplink NAS transport message with an Attach Complete NAS message 308. By the end of this procedure the radio network node 110, and/or the VSE, will be able to start sending user plane data using the newly established radio access bearer over the S1 interface and the NAS.

Figure 4:
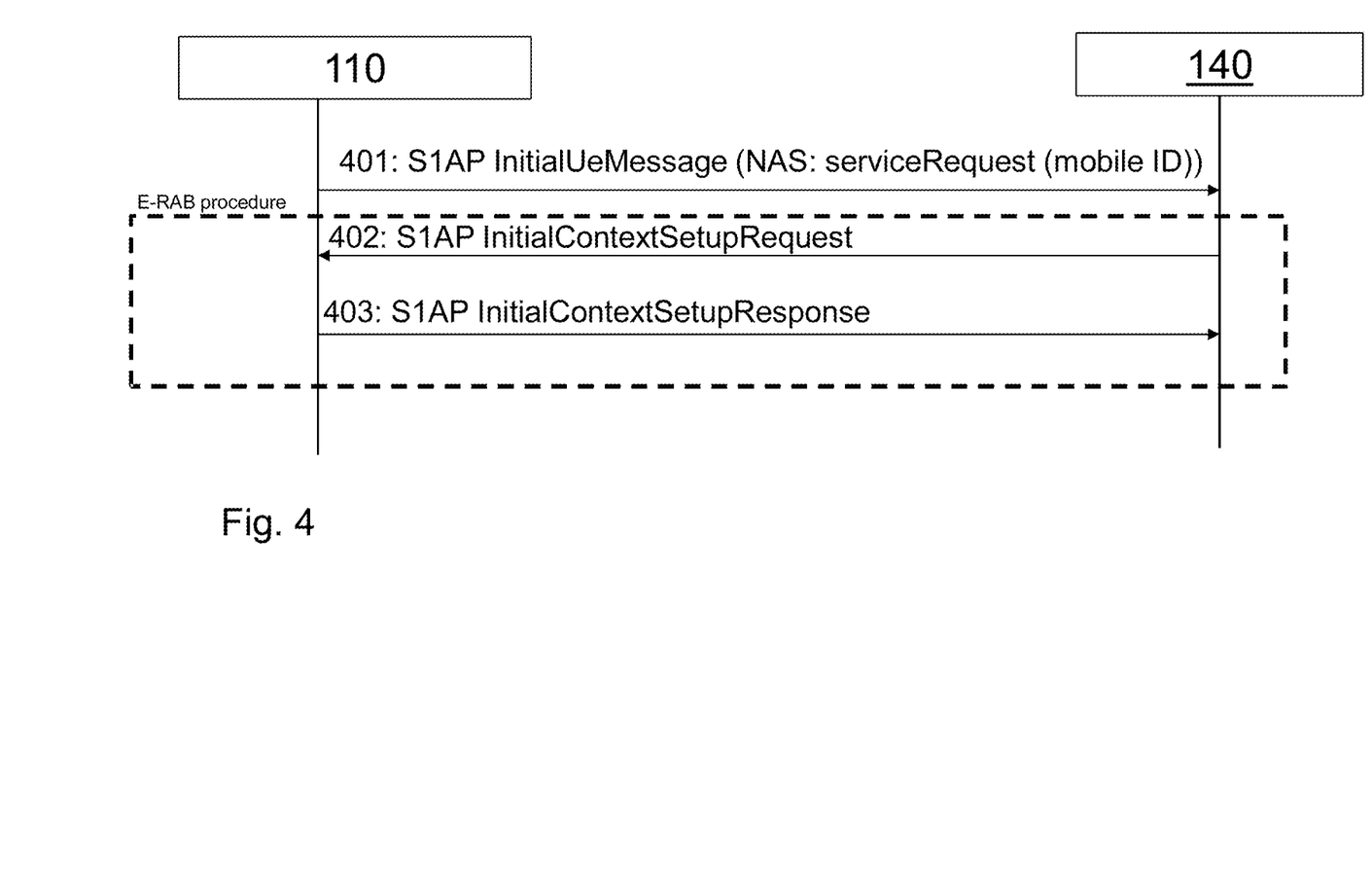
FIG. 4 is a signaling diagram depicting a service procedure for the radio network node according to embodiments herein.

FIG. 4 shows a signaling diagram according to one embodiment herein, in which the message requesting to establish an end-to-end connection with the CD server is an S1AP service request procedure, which may be used by the radio network node 110 to resume existing bearers set up during the attach procedure disclosed in FIG. 3 in order to gain access to the NAS-level services via the core network node 140. When the existing radio bearers are resumed encryption of the transmission may be set up without having to perform the security and authentication procedure, as performed during the attach procedure. Hence, during the service request procedure only the actions for setting up the radio bearer have to be performed. The procedure starts with the radio network node 110 sending an S1AP Initial UE message comprising a NAS service request with its mobile identity 401. The access bearer establishment procedure, such as e.g. a Radio Access Bearer (RAB) or an Enhanced Radio Bearer (E-RAB) establishment depending on the technology, then starts with the core network node 140 sending an Initial UE context Setup S1AP setup request. The radio network node 110, and/or the VSE, may reply with an Initial Context Setup response message 403.

Figure 5:
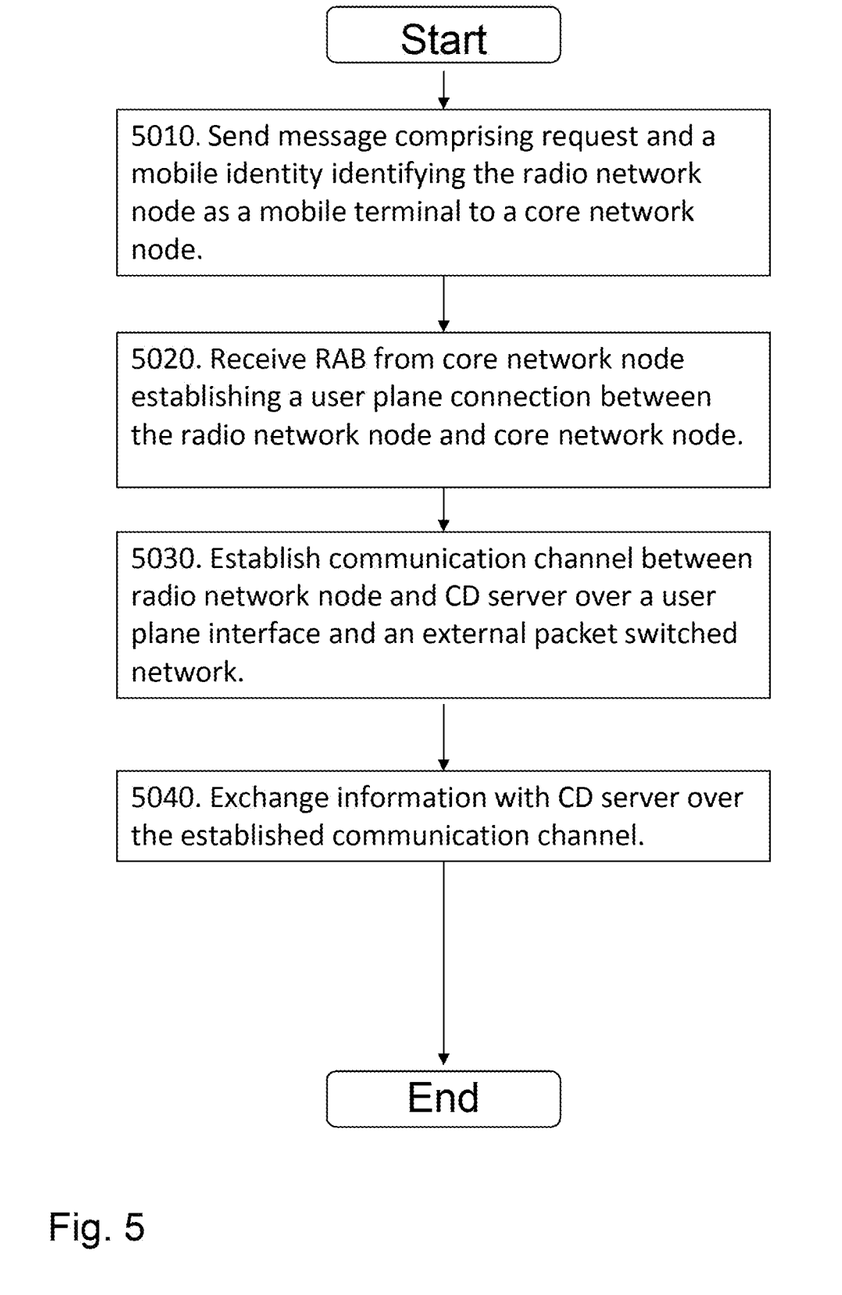
FIG. 5 is a flowchart depicting a method performed by a radio network node according to embodiments herein.

The method actions performed by the radio network node 110, for performing continuous deployment and feedback between the radio network node 110 and a CD server 120 according to embodiments herein, will now be described with reference to a flowchart depicted in FIG. 5. The radio network node 110 is configured to mimic the behavior of a mobile terminal 130, such as e.g. a UE, towards the core network.

The actions do not have to be taken in the order stated below, but may be taken in any suitable order. Actions performed in some embodiments only are marked with dashed boxes.

Action 5010: The radio network node 110 sends, to a core network node 140, a message comprising a request to establish an end-to-end connection with the CD server, such as e.g. an attach request or a service request. The message further comprises a mobile identity identifying the radio network node 110 as a mobile terminal. The mobile identity may e.g. be an International Mobile Subscriber Identity (IMSI) or any temporary identity provided by the core network, such as e.g. a GUTI. The radio network node 110 may e.g. comprise a Virtual Subscriber Entity (VSE), which has an IMSI and acts as the mobile terminal towards the core network.

Action 5020: The radio network node 110 receives, from the core network node 140, an Access Bearer, such as e.g. a Radio Access Bearer (RAB) or an Enhanced Radio Access Bearer (E-RAB) depending on the technology used, establishing a user plane connection between the radio network node 110 and the core network node 140 over a user plane interface, such as e.g. an S1 interface.

Action 5030: The radio network node 110 establishes a communication channel 160 between the radio network node 110 and the CD server 120 over the user plane interface and an external packet switched network 150, such as e.g. over the internet.

The communication channel 160 may be an end-to-end (E2E) connection between the radio network node 110 and the CD server 120, such that the user plane communication is terminated when it reaches the radio network node 110 and/or the CD server 120.

In some embodiment the communication channel 160 between the radio network node 110 and the CD server 120 may be a secure connection, such as e.g. a Virtual Private Network (VPN) connection. Thus, unauthorized users may be prevented from accessing information exchanged between the radio network node 110 and the CD server 120.

Action 5040: The radio network node 110 exchanges information between the radio network node 110 and the CD server 120 over the established communication channel 160.

Exchanging information may comprise the radio network node 110 sending data from an internal storage to the CD server 120. The data sent to the CD server 120 may e.g. comprise software files, diagnostic data and/or performance data of the radio network node 110.

Exchanging information may further comprise the radio network node 110 receiving data from the CD server 120. The data received from the CD server 120 may e.g. comprise new software to be loaded onto the radio network node 110, patches and/or configurations for the radio network node 110. When the data has been received by the radio network node 110 it may be loaded onto the radio network node 110 in order to update the software or configuration of the radio network node 110.

Hence, the exchanged information is related to the radio network node 110.

Figure 6:
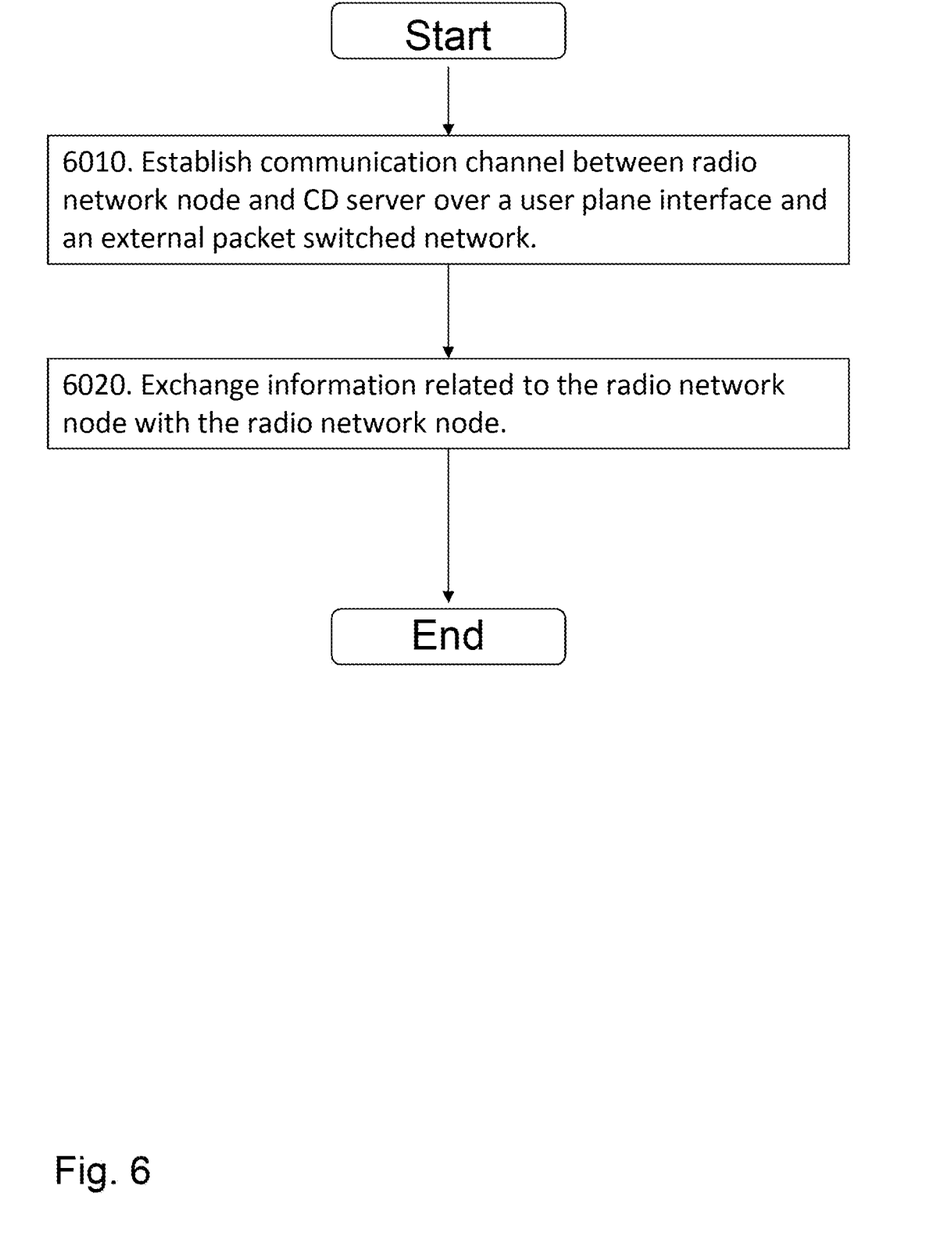
FIG. 6 is a flowchart depicting a method performed by a Continuous Deployment server according to embodiments herein.

The method actions performed by the Continuous Deployment (CD) server 120, for performing continuous deployment and feedback between a radio network node 110 and the CD server 120 according to embodiments herein, will now be described with reference to a flowchart depicted in FIG. 6. The radio network node 110 is configured to mimic a behavior of a mobile terminal 130, such as e.g. a UE towards a core network. The actions do not have to be taken in the order stated below, but may be taken in any suitable order. Actions performed in some embodiments only are marked with dashed boxes.

Action 6010: The CD server 120 establishes a communication channel 160 between the radio network node 110 and the CD server 120 over a user plane interface, such as e.g. an S1 interface, and an external packet switched network 150, such as e.g. the internet.

The communication channel 160 may be an end-to-end (E2E) connection between the radio network node 110 and the CD server 120, such that the user plane communication is terminated when it reaches the radio network node 110 and/or the CD server 120.

The communication channel 160 between the CD server 120 and the radio network node 110 may further be a secure connection, such as e.g. a Virtual Private Network (VPN) connection. Thus, unauthorized users may be prevented from accessing information exchanged between the CD server 120 and the radio network node 110.

Action 6020: The CD server 120 exchanges information between the radio network node 110 and the CD server 120, which may also be referred to as exchanging information with the radio network node 110, over the established communication channel 160.

The action of exchanging of information may comprise the CD server 120 receiving data from an internal storage in the radio network node 110. The data received from the radio network node 110 may comprise software files, diagnostic data and/or performance data relating to the radio network node 110.

The action of exchanging information may further comprise the CD server 120 sending data to the radio network node 110. The data sent to the radio network node 110 may e.g. comprise new software, patches and/or configurations for the radio network node 110.

Hence, the exchanged information is related to the radio network node 110.

Figure 7:
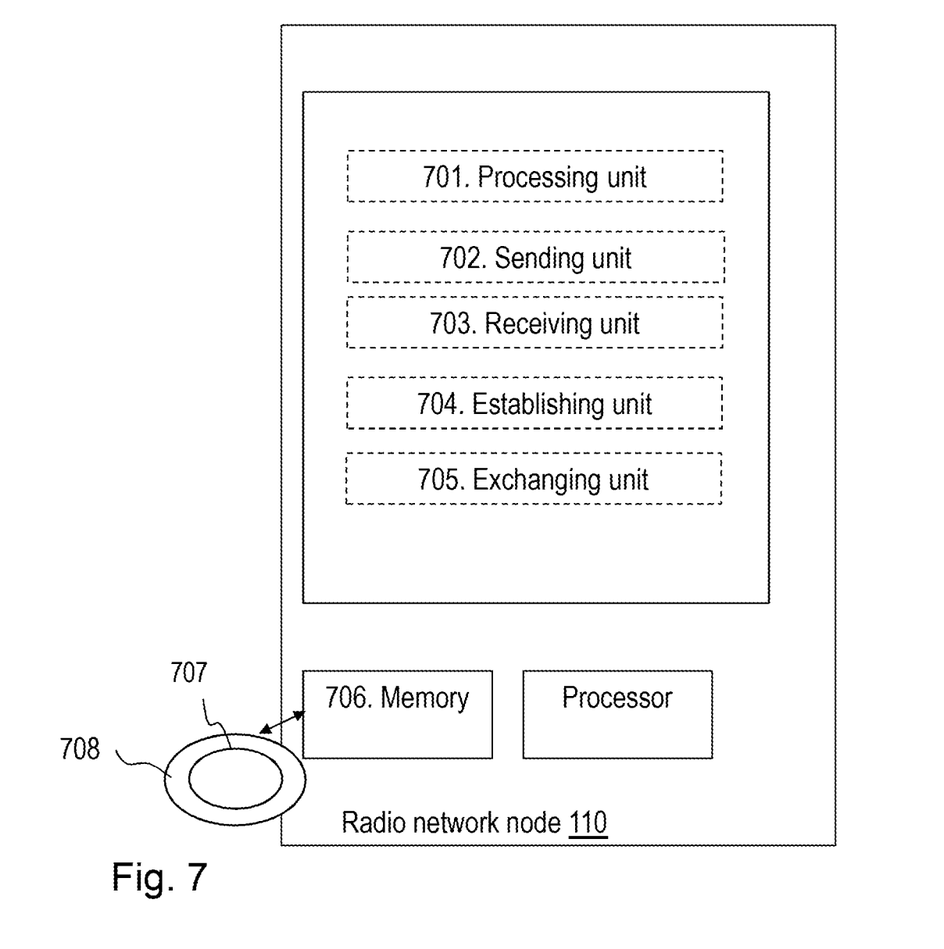
FIG. 7 is a block diagram depicting a radio network node according to embodiments herein.

FIG. 7 is a block diagram depicting the radio network node 110, for performing continuous deployment and feedback between the radio network node 110 and a Continuous Deployment (CD) server. The radio network node 110 is configured to mimic a behavior of a mobile terminal 130, such as e.g. a UE, towards the core network.

The radio network node 110 may comprise a processing unit 701, such as e.g. one or more processors, a sending unit 702, a receiving unit 703, an establishing unit 704, and an exchanging unit 705 as exemplifying hardware units configured to perform the methods described herein.

The radio network node 110, the sending unit 702 and/or the processing unit 701 is configured to send, to a core network node 140, a message comprising a request to establish an end-to-end connection with the CD server, such as e.g. an attach request and/or a service request. The message further comprises a mobile identity identifying the radio network node 110 as a mobile terminal. The mobile identity may e.g. be an International Mobile Subscriber Identity (IMSI) or any temporary identity provided by the core network, such as e.g. a GUTI.

The radio network node 110, the receiving unit 703 and/or the processing unit 701 is further configured to receive, from the core network node 140, an access bearer, such as e.g. a RAB or an E-RAB, establishing a user plane connection between the radio network node 110 and the core network node 140 over a user plane interface, such as e.g. an S1 interface.

The radio network node 110, the establishing unit 704 and/or the processing unit 701 is configured to establish a communication channel 160 between the radio network node 110 and the CD server 120 over the user plane interface and an external packet switched network 150, such as e.g. the internet.

The radio network node 110, the establishing unit 704 and/or the processing unit 701 may further be configured to establish an end-to-end (E2E) connection as a communication channel 160 between the radio network node 110 and the CD server 120, such that the user plane communication is terminated when it reaches the radio network node 110 and/or the CD server 120.

The radio network node 110, the establishing unit 704 and/or the processing unit 701 may further be configured to establish a is a secure connection, such as e.g. a Virtual Private Network (VPN) connection, as a communication channel 160 between the radio network node 110 and the CD server 120.

The radio network node 110, the exchanging unit 705 and/or the processing unit 701 is configured to exchange information between the radio network node 110 and the CD server 120 over the established communication channel 160.

The radio network node 110, the exchanging unit 705, the sending unit 702 and/or the processing unit 701 may further be configured to exchange information between the radio network node 110 and the CD server 120 by being configured to send data from an internal storage in the radio network node 110 to the CD server 120. The data sent to the CD server 120 may comprise software files, diagnostic data and/or performance data of the radio network node.

The radio network node 110, the exchanging unit 705, the receiving unit 703 and/or the processing unit 701 may further be configured to exchange information by being configured to receive data from the CD server 120. The data received from the CD server 120 may comprise new software to be loaded, patches and/or configurations for the radio network node.

The embodiments herein may be implemented through a respective processor or one or more processors, such as the processing unit 701 of a processing circuitry in the radio network node depicted in FIG. 7, together with respective computer program code for performing the functions and actions of the embodiments herein. The program code mentioned above may also be provided as a computer program product, for instance in the form of a data carrier carrying computer program code for performing the embodiments herein when being loaded into the radio network node 110. One such carrier may be in the form of a CD ROM disc. It is however feasible with other data carriers such as a memory stick. The computer program code may furthermore be provided as pure program code on a server and downloaded to the radio network node 110.

The radio network node 110 may further comprise a memory 706. The memory 706 comprises one or more memory units to be used to store data on, such as software, patches, system information, configurations, diagnostic data, performance data and/or applications to perform the methods disclosed herein when being executed, and similar.

The methods according to the embodiments described herein for the radio network node 110 are respectively implemented by means of e.g. a computer program 707 or a computer program product, comprising instructions, i.e., software code portions, which, when executed on at least one processor, cause the at least one processor to carry out the actions described herein, as performed by the radio network node 110. The computer program 707 may be stored on a computer-readable storage medium 708, e.g. a disc or similar. The computer-readable storage medium 708, having stored thereon the computer program, may comprise instructions which, when executed on at least one processor, cause the at least one processor to carry out the actions described herein, as performed by the radio network node 110. In some embodiments, the computer-readable storage medium may be a non-transitory computer-readable storage medium.

Figure 8:
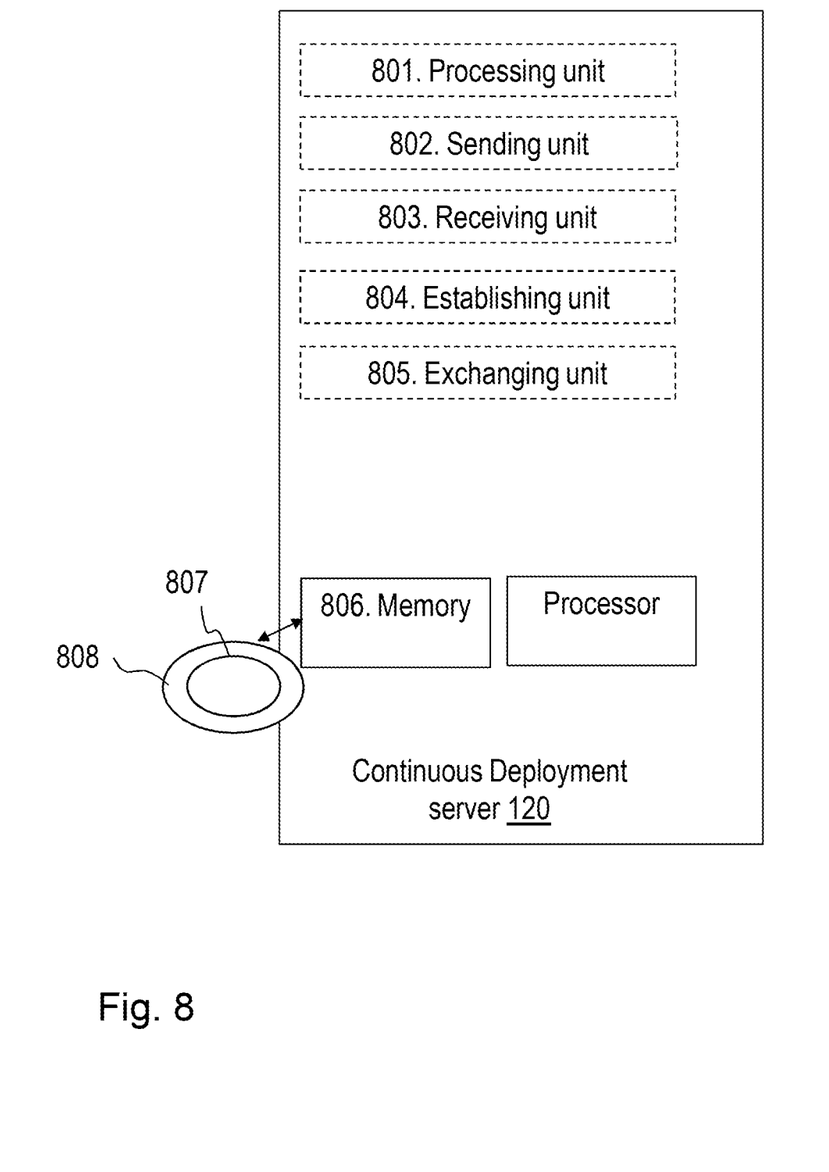
FIG. 8 is a block diagram depicting a Continuous Deployment server according to embodiments herein.

FIG. 8 is a block diagram depicting the CD server 120, for performing continuous deployment and feedback between the radio network node 110 and the CD server 120. The radio network node 110 is configured to mimic the behavior of a mobile terminal 130, such as e.g. a UE, towards the core network.

The CD server 120 may comprise a processing unit 801, such as e.g. one or more processors, a sending unit 802, a receiving unit 803, an establishing unit 804, and an exchanging unit 805 as exemplifying hardware units configured to perform the methods described herein.

The CD server 120, the establishing unit 804 and/or the processing unit 801 is configured to establish a communication channel 160 between the CD server 120 and the radio network node 110 over the user plane interface and the external packet switched network 150, such as e.g. the internet.

The CD server 120, the establishing unit 804 and/or the processing unit 801 may further be configured to establish an end-to-end (E2E) connection as a communication channel 160 between the CD server 120 and the radio network node 110, such that the user plane communication is terminated when it reaches the radio network node 110 and/or the CD server 120.

The CD server 120, the establishing unit 804 and/or the processing unit 801 may further be configured to establish a is a secure connection, such as e.g. a Virtual Private Network (VPN) connection, as a communication channel 160 between the radio network node 110 and the CD server 120.

The CD server 120, the exchanging unit 805 and/or the processing unit 801 is configured to exchange information between the CD server 120 and the radio network node 110 over the established communication channel 160.

The CD server 120, the exchanging unit 805, the receiving unit 803 and/or the processing unit 801 may further be configured to exchange information between the radio network node 110 and the CD server 120 by being configured to receive data from an internal storage in the radio network node 120. The data received from the radio network node 110 may comprise software files, diagnostic data and/or performance data of the radio network node 110.

The CD server 120, the exchanging unit 805, the sending unit 802 and/or the processing unit 801 may further be configured to exchange information by being configured to send data to the radio network node 110. The data sent to the radio network node 110 may comprise new software to be loaded, patches and/or configurations for the radio network node 110.

The embodiments herein may be implemented through a respective processor or one or more processors, such as the processing unit 801 of a processing circuitry in the CD server depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the CD server. One such carrier may be in the form of a CD ROM disc. It is however feasible with other data carriers such as a memory stick. The computer program code may furthermore be provided as pure program code on a server and downloaded to the CD server 120.

The CD server 120 may further comprise a memory 806. The memory 806 comprises one or more memory units to be used to store data on, such as software, patches, system information, configurations, diagnostic data, performance data and/or applications to perform the methods disclosed herein when being executed, and similar. The methods according to the embodiments described herein for the CD server 120 are respectively implemented by means of e.g. a computer program 807 or a computer program product, comprising instructions, i.e., software code portions, which, when executed on at least one processor, cause the at least one processor to carry out the actions described herein, as performed by the CD server 120. The computer program 807 may be stored on a computer-readable storage medium 808, e.g. a disc or similar.

The computer-readable storage medium 808, having stored thereon the computer program, may comprise instructions which, when executed on at least one processor, cause the at least one processor to carry out the actions described herein, as performed by the CD server 120. In some embodiments, the computer-readable storage medium may be a non-transitory computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

The embodiments herein may also be performed by a Virtual Subscriber Entity (VSE) comprised in the radio network node, such as an eNB. The VSE may be configured to perform the method actions according to the embodiments herein. The VSE may have access to an internal system management database and information in the radio network node and may send and receive data to/from the CD server by acting as a commercial UE.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node, for performing continuous deployment and feedback between the radio network node and a Continuous Deployment, CD, server, wherein the radio network node is configured to mimic a behavior of a mobile terminal towards a core network, wherein the method comprises:

sending, to a core network node, a message comprising a request to establish an end-to-end connection with the CD server, which message further comprises a mobile identity identifying the radio network node as a mobile terminal, receiving, from the core network node, an access bearer, establishing a user plane connection between radio network node and the core network node over a user plane interface, establishing a communication channel between the radio network node and the CD server over the user plane interface and an external packet switched network, and exchanging information between the radio network node and the CD server over the established communication channel, wherein the radio network node is an eNB, a gNB or a 2G/3G radio network node and is not the mobile terminal.

2. The method according to claim 1, wherein the step of exchanging information comprises the radio network node sending data from an internal storage in the radio network node to the CD server.

3. The method according to claim 2, wherein the data sent to the CD server comprises software files, diagnostic data and/or performance data of the radio network node.

4. The method according to claim 1, wherein the step of exchanging information comprises the radio network node receiving data from the CD server.

5. The method according to claim 4, wherein the data received from the CD server comprises new software to be loaded, patches and/or configurations for the radio network node to update the software or configurations of the radio network node.

6. The method according to claim 1, wherein the mobile identity is an International Mobile Subscriber Identity, IMSI or a temporary identity provided by the core network.

7. The method according to claim 1, wherein the communication channel is an end-to-end, E2E, connection between the radio network node and the CD server, such that the user plane communication is terminated when it reaches the radio network node and/or the CD server.

8. The method according to claim 1, wherein the communication channel between the radio network node and the CD server is a secure connection, wherein the secure connection is a Virtual Private Network, VPN, connection.

9. The method according to claim 1, wherein the radio network node comprises a Virtual Subscriber Entity, VSE, for signalling the mobile identity to the core network node, wherein the VSE comprises an International Mobile Subscriber Identity, IMSI, or a temporary identity provided by the core network.

10. A method performed by Continuous Deployment, CD, server, for performing continuous deployment and feedback between a radio network node and the CD server, wherein the radio network node is configured to mimic a behavior of a mobile terminal towards a core network, wherein the method comprises:

establishing a communication channel between the radio network node and the CD server over a user plane interface and an external packet switched network, and exchanging information between the radio network node and the CD server over the established communication channel, wherein the radio network node is an eNB, a gNB or a 2G/3G radio network node and is not the mobile terminal.

11. The method according to claim 10, wherein the step of exchanging information comprises the CD server receiving data from an internal storage of the radio network node.

12. The method according to claim 11, wherein the data received from the radio network node comprises software files, diagnostic data and/or performance data of the radio network node.

13. The method according to claim 10, wherein the step of exchanging information comprises the CD server sending data to the radio network node.

14. The method according to claim 13, wherein the data sent to the radio network node comprises new software to be loaded, patches and/or configurations for the radio network node to update the software or configurations of the radio network node.

15. A radio network node, for performing continuous deployment and feedback between the radio network node and a Continuous Deployment, CD, server, wherein the radio network node is configured to mimic a behavior of a mobile terminal towards a core network, wherein the radio network node comprises:
   a sending unit being configured to send, to a core network node, a message comprising a request to establish an end-to-end connection with the CD server, which message comprises a mobile identity identifying the radio network node as a mobile terminal,
   a receiving unit being configured to receive, from the core network node, an access bearer establishing a user plane connection between the radio network node and the core network node over an user plane interface,
   an establishing unit being configured to establish a communication channel between the radio network node and the CD server over the user plane interface and an external packet switched network, and
   an exchanging unit being configured to exchange information between the radio network node and the CD server over the established communication channel,
   wherein the radio network node is an eNB, a gNB or a 2G/3G radio network node and is not the mobile terminal.

16. A Continuous Deployment, CD, server, for performing continuous deployment and feedback between a radio network node and the CD server, wherein the radio network node is configured to mimic a behavior of a mobile terminal towards a core network, wherein the CD server comprises:
   an establishing unit being configured to establish a communication channel between the radio network node and the CD server over a user plane interface and an external packet switched network, and
   an exchanging unit being configured to exchange information between the radio network node and the CD server over the established communication channel,
   wherein the radio network node is an eNB, a gNB or a 2G/3G radio network node and is not the mobile terminal.

* * * * *